(12) United States Patent
Martinez Navarro

(10) Patent No.: US 12,390,042 B2
(45) Date of Patent: Aug. 19, 2025

(54) MACHINE FOR PROCESSING COMPOSITE PRODUCTS CONSISTING OF MIXTURES, MIXING ELEMENT AND MIXING ASSEMBLY

(71) Applicant: IT FOOD, Albacete (ES)

(72) Inventor: Gabriel Martinez Navarro, Albacete (ES)

(73) Assignee: IT FOOD, Albacete (ES)

( * ) Notice: Subject to any disclaimer, the term of this patent is extended or adjusted under 35 U.S.C. 154(b) by 858 days.

(21) Appl. No.: 16/499,462

(22) PCT Filed: Mar. 23, 2018

(86) PCT No.: PCT/ES2018/070235
§ 371 (c)(1),
(2) Date: Sep. 30, 2019

(87) PCT Pub. No.: WO2018/178456
PCT Pub. Date: Oct. 4, 2018

(65) Prior Publication Data
US 2020/0022526 A1    Jan. 23, 2020

(30) Foreign Application Priority Data

Mar. 28, 2017  (ES) .................................. 201730438

(51) Int. Cl.
*A47J 31/40*    (2006.01)
*A47J 31/44*    (2006.01)
(Continued)

(52) U.S. Cl.
CPC ............. *A47J 31/401* (2013.01); *A47J 31/44* (2013.01); *A47J 31/4403* (2013.01); *A47J 43/04* (2013.01);
(Continued)

(58) Field of Classification Search
CPC ........ A47J 31/402; A47J 31/40; A47J 31/404; A47J 31/4407; A47J 31/401; A47J 31/44; A47J 31/4403
(Continued)

(56) References Cited

U.S. PATENT DOCUMENTS

2012/0308688 A1* 12/2012 Peterson ............... A47J 31/002
                                                                426/86
2016/0280526 A1*  9/2016 O'Laughlin .......... A47J 31/401

FOREIGN PATENT DOCUMENTS

CN         103889286 A  *  6/2014  ............. A23L 2/385
DE    10 2009 036 839 A1     2/2011
(Continued)

OTHER PUBLICATIONS

International Search Report for PCT/ES2018/070235 dated Jul. 25, 2018 [PCT/ISA/210].

*Primary Examiner* — Steven W Crabb
*Assistant Examiner* — Alba T Rosario-Aponte
(74) *Attorney, Agent, or Firm* — Sughrue Mion, PLLC

(57) ABSTRACT

The present invention, which is entitled mixture-based composite product processing machine, mixing element, and mixing assembly, relates to a mixed product dispensing machine of the type that dispenses a mixture of liquid or powder components or ingredients into a mixing element onto which a leak-tight cover is subsequently placed and inside which, as a result of its particular configuration, the liquid and/or powder portions are mixed by spinning them in a coordinated manner on at least one spinning head of the machine to which said container is coupled.

8 Claims, 3 Drawing Sheets

(51) Int. Cl.
    *A47J 43/04*    (2006.01)
    *B01F 29/80*    (2022.01)
    *B65D 45/32*    (2006.01)
    *B65D 51/32*    (2006.01)
    *B65D 81/34*    (2006.01)
    *B65D 85/72*    (2006.01)
    *B67D 1/00*     (2006.01)

(52) U.S. Cl.
    CPC .............. *B01F 29/80* (2022.01); *B65D 45/32* (2013.01); *B65D 51/32* (2013.01); *B65D 81/34* (2013.01); *B65D 85/72* (2013.01); *B67D 1/00* (2013.01)

(58) Field of Classification Search
    USPC .................................. 99/295, 275, 279, 300
    See application file for complete search history.

(56) References Cited

FOREIGN PATENT DOCUMENTS

| | | |  |
|---|---|---|---|
| EP | 1 227 043 A1 | 7/2002 | |
| EP | 2168468 A1 * | 3/2010 | ............ A47J 31/401 |
| FR | 2654075 A | 5/1991 | |
| GB | 1367354 A | 9/1974 | |
| WO | 2013/041580 A1 | 9/2012 | |
| WO | WO-2014054301 A1 * | 4/2014 | ............... A23N 1/02 |
| WO | WO-2014095985 A1 * | 6/2014 | ............ A47J 31/401 |

\* cited by examiner

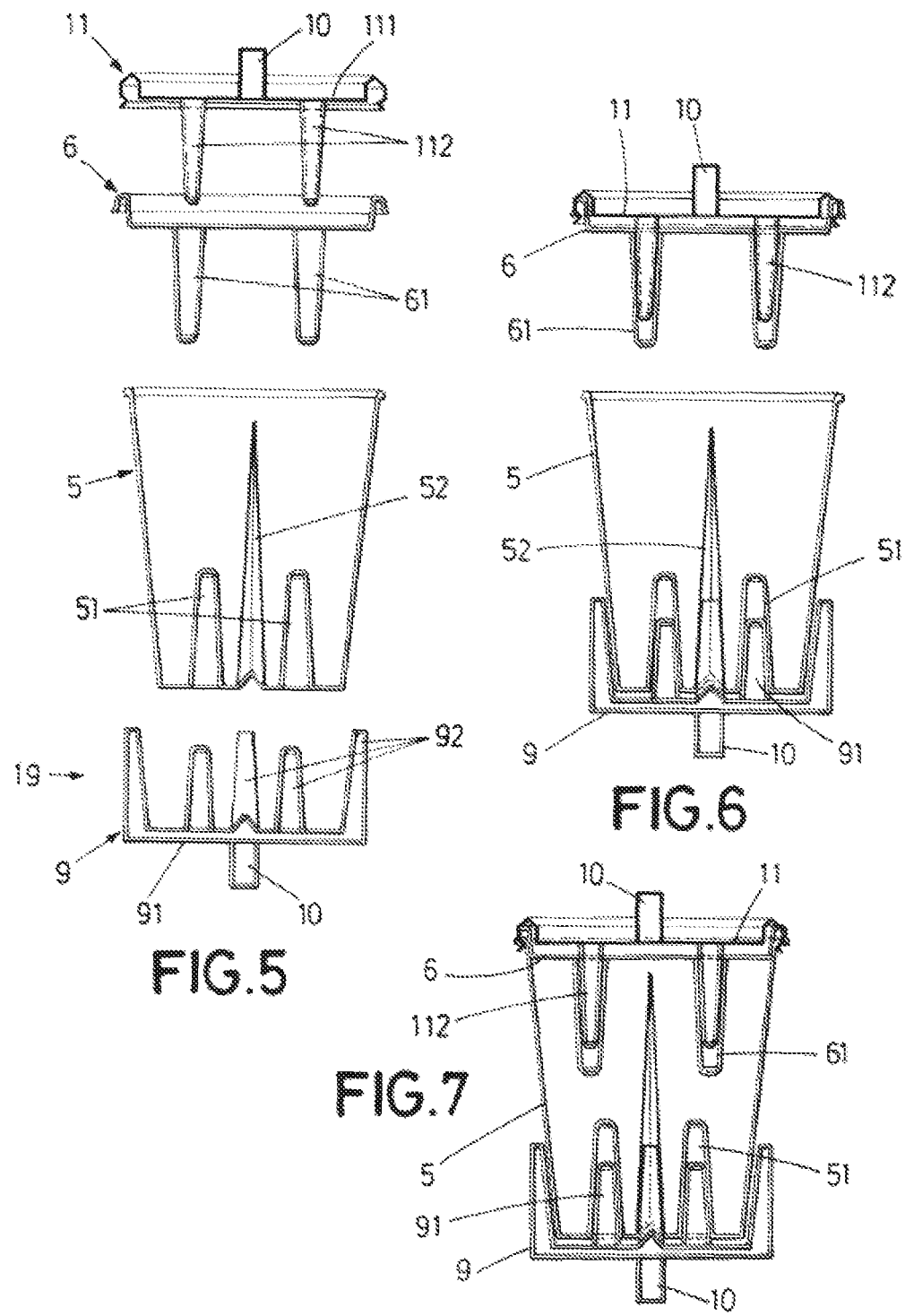

MACHINE FOR PROCESSING COMPOSITE PRODUCTS CONSISTING OF MIXTURES, MIXING ELEMENT AND MIXING ASSEMBLY

CROSS REFERENCE TO RELATED APPLICATIONS

This application is a National Stage of International Application No. PCT/ES2018/070235 filed Mar. 23, 2018, claiming priority based on Spanish Application No. P201730438 filed Mar. 28, 2017.

DESCRIPTION

Object of the Invention

The invention, which is entitled mixture-based composite product processing machine, mixing element, and mixing assembly, relates to a product dispensing machine of the type that dispense products into a mixing element with a container, said products consisting of a mixture of powders with a liquid ingredient or a mixture of two or more liquid ingredients, at the same or different temperatures, said machine being configured for dispensing the products into mixing elements formed at least by mixing containers preferably with a leak-tight cover, inside which and as a result of its particular configuration, the liquid and powdery portions are mixed by spinning them in a coordinated manner on at least one spinning head of the machine to which said container is coupled. In any case, the machine will preferably be used for processing edible products by means of mixing powder foods or liquids with water or other liquids, or a mixture of different liquids, in the mixing container itself. The use of water will be preferred over other liquid products to thereby prevent the need to clean the inside of the machine and particularly the conduits for said liquid.

The field of application of the present invention is preferably comprised in the sector of the industry dedicated to the manufacture of machines for dispensing foods that are reconstituted or mixed at the time of consumption, covering at the same time the sector of the industry dedicated to the manufacture of containers for machines of said type. Alternatively, the machine can be used for sectors other than the food sector, such as the cosmetics sector, decoration (paint) sector, or dental sector, for example, where the machine object of the invention can be used for mixing other compounds, for example.

BACKGROUND OF THE INVENTION

There are known on the market machines for dispersing beverages, for example, coffee, which dispense a disposable cup as a consumer container into which they pour a mixture of powders with water, milk, or another liquid at different temperatures, which mixture is generally elaborated inside the machine before being poured into the cup, so the machine must have the mechanisms required to make said mixture.

The objective of the present invention is to simplify the configuration of the machine so that said mixing phase does not take place in the machine but rather in the actual cup into which the beverage is poured and dispensed, therefore lowering the costs and simplifying dispensing machine manufacture.

Likewise, machines comprising means for improving the process of mixing ingredients making up the product in the mixing container, being limited to pouring or dispensing the ingredients into the mixing container with the container subsequently being removed and the product consumed by the user, are not known in the state of the art.

Therefore, an object of the present invention relates to a machine having means which facilitate the mixing of ingredients in the mixing container itself by means of the movement of the mixing container and/or the cover of the mixing container. Both components, i.e., container and cover, form the mixing element for the purpose of the present description. As mentioned, the present invention is not limited to the food sector in which the use thereof is preferred, but rather may be extended to other sectors in which product mixing is required.

To achieve the foregoing, the mixing element must have specific features that are not known in the state of the art.

BRIEF DESCRIPTION OF THE INVENTION

A first object of the present invention for solving the preceding problems therefore relates to a mixture-based composite product processing machine according to claim 1.

Specifically, said machine processes composite products based on two or more ingredients, at least one being a liquid and the other a powder, by means of at least mixing and dispensing same, and which machine has at least one upper dispenser for pouring ingredients and a lower base for supporting the mixing element. The dispenser and the base determine therebetween a mixing space for housing the mixing element which will be placed on the base, the mixing element comprising at least one spinning head with a coupling element which is arranged between said spinning head and the mixing space, such that said coupling element has an anchoring structure for being fastened to the spinning head and a coupling structure for coupling the mixing element arranged in the mixing space thereto.

Both the anchoring structure and the coupling structure may have different constructions and elements, such that in the case of the anchoring structure for anchoring to the head, the means used assure that said structure will not come loose or detach from the head, and in the case of the coupling structure for coupling to the mixing element, said coupling structure or means assure that the mixing element will not come loose or uncouple from the mixing element while the spinning head spins.

Said spinning head can be arranged in the lower portion of the mixing space and/or in the upper portion of the mixing space. In the case of comprising two spinning heads, the first spinning head in the lower portion of the mixing space and the second spinning head in the upper portion of the mixing space, or vice versa, each of said spinning heads will comprise a coupling element arranged between the head and the mixing space, so each coupling element will comprise an anchoring structure for the spinning head and a coupling structure for the mixing element.

To enable anchoring between the spinning head and the coupling element, they both have complementary anchoring structures assuring the positioning with one another and the joint operation of both elements.

Likewise, the coupling structure for the mixing element comprises at least one projection or protuberance intended for being inserted into a complementary recess located in the mixing element, such that the connection between both is assured when the spinning head spins without any risk of the mixing element uncoupling from the coupling structure.

The mentioned spinning heads are independent spinning heads, such that the mechanisms moving them, preferably electric motors, allow their independent activation, so they can spin at different speeds and in different directions, or at the same speeds and in different directions, or at the same speeds and in the same direction.

The mixing elements are formed by a mixing container and a cover, such that the container is coupled through the lower base thereof to the base or lower spinning head and the cover is coupled through the upper base thereof to the upper spinning head. As mentioned, the case may arise where a spinning head is not present in the machine at one of the ends or where, even if it is present, said spinning head does not have a motor, i.e., it spins freely activated by the opposite spinning head. The case may even arise where one of the spinning heads, despite having a spinning motor, spins freely without the motor acting.

The machine also comprises a module which dispenses the components of the mixing elements, i.e., the covers and containers, from independent dispensers to the mixing space. The sequence would be as follows:
- a container is dispensed into the mixing area from a dispensing module for dispensing containers,
- said container is coupled to the base or to the lower spinning head if the machine has one,
- ingredients, i.e., the at least one powder product and liquid product, are dispensed from the dosing elements of the machine into the container,
- a cover is dispensed from the dispensing module for dispensing covers to the mixing area. Said cover can be directly coupled in a leak-tight manner on the container, closing said container, and the upper spinning head, if any, is then coupled to the cover, or alternatively the cover is placed directly on the upper spinning head which moves down until coupling the cover on the container in a leak-tight manner, and
- the at least one upper and/or lower spinning head starts to spin to assure the mixing of the ingredients inside the mixing element.

A second object of the invention relates to the mixing element for the machine comprising a container and a cover as components, such that at least one of the two components comprises at least one base with at least one hollow elongation perpendicular to the at least one base of the mixing element.

The container is of the type with a base, at least one side wall, and an upper opening determining an inner space, the base comprising at least one recess, protuberance, or elongation that is hollow and goes into the inner space of the container, reducing the volume thereof. Said hollow elongation has a conical, pyramidal, frustoconical, or truncated pyramid shape, such that it allows stacking the containers. The function of said elongation or elongations, which are preferably two in number, is to interfere with or change the spin of the powder and liquid mixture, interfering with its inertia, inside the container which is mixed when the ingredients spin to cause the mixing thereof. Said hollow elongations may have different shapes and lengths, but always with a lower base having an area that is larger than the opposite end of the elongation to allow stacking different containers.

Additionally, the at least one side wall comprises at least one side recess which, like the vertical elongations, goes into the inner space of the container, reducing the volume thereof and also allowing the stacking of containers as a result of the shape thereof.

The cover has a body with a substantially planar base surrounded by at least one side wall, said base comprising a hollow vertical elongation. Said cover also has at least one side wall with leak-tight means for leak-tight coupling with the container. Said cover may also comprise one or more, preferably two, hollow elongations. Like in the case of the hollow elongations of the container, the function of the elongations is to interfere with or change the spin of the powder and liquid mixture, interfering with its inertia, inside the container which is mixed when the ingredients spin to cause the mixing thereof. Said hollow elongations may have different shapes and lengths, but always with a lower base having an area that is larger than the opposite end of the elongation to allow stacking different containers.

Preferably, the hollow elongations have a length of at least one fourth the height of the container, as it is the minimum preferable length for interfering with the spin for mixing the products, thereby contributing to the mixing thereof. The maximum height of the hollow elongations is preferably three fourths the height of the container.

Additionally, in the event that both the cover and the container of a mixing element comprise hollow elongations, the sum of the lengths of the at least one protuberance of the container and of the at least one protuberance of the cover is less than the height of the container.

Another function of the hollow elongations is to allow the coupling element arranged between the mixing element and the spinning head to insert the coupling structure into the elongations, such that the coupling between both and the joint spinning thereof are assured.

A third object of the invention relates to a mixing assembly for an edible, mixture-based, composite product processing machine, comprising:
- a mixing element with at least one base with at least one hollow elongation perpendicular to the at least one base of the mixing element, and
- a coupling element with a coupling structure complementary to the at least one elongation of the element and an anchoring structure for anchoring to a spinning head in a product processing machine.

The machine may comprise a processor or CPU (Central Processing Unit) which allows storing and running different mixing programs depending on the ingredients to be mixed, such that it transmits instructions to different elements of the machine, mainly to the motors of the spinning heads, the dispensers for dispensing covers and containers, the dispensers for dispensing ingredients, as well as other elements such as coolers and heaters, which are required depending on the product to be consumed once the ingredients are mixed.

In a preferred operating mode, the processing machine object of the present invention performs the following steps to obtain the edible product after pressing a start button:
1) The machine places the container of a cup mixing element on the base which preferably constitutes the lower spinning head, causing the projections of said base or head to be inserted into the recesses of the mixing container.
2) The mixing container receives a predetermined volume of at least one liquid, and then another predetermined volume of at least one powdery ingredient. Optionally, the liquid and the powder may be dispensed into the container at the same time, or the liquid may be dispensed first, then the powder and then the liquid, such that the powder is in the center of the mixing cup.
3) The machine places a cover on the mixing container with the projections present in the upper spinning head being coupled to recesses in the cover, and applies pressure on the cup to make the coupling between the cover and the mixing container leak-tight.

4) Once the cup has been covered, the upper and lower spinning heads start to spin to achieve states of maximum turbulence, preferably in the following manner:
   a) at the same speed and with both heads in the same direction so as to change the direction as a whole in an alternating manner, or
   b) with one head in a direction opposite that of the other head and changing the direction in an alternating manner, or
   c) spinning only the lower head, spinning the mixing container, whereas the upper head and the cover remain stationary, and changing the direction in an alternating manner.
5) once the predetermined time stored in the processor has lapsed, the machine informs the user to take the already mixed product out.

As mentioned, the invention can be used for processing and mixing different components or ingredients in different sectors such as the food sector, cosmetics sector, decorative sector, or dental sector.

DESCRIPTION OF THE DRAWINGS

To complete the description of the invention and for the purpose of facilitating the understanding of the invention, a set of illustrative and non-limiting drawings is included in the present specification as an integral part thereof:

FIGS. 5, 6, and 7 show respective section views of the container with the cover and the coupling elements that the machine has for fastening and spinning in progressive phases of coupling said elements to the container and the cover of the mixing element, respectively.

PREFERRED EMBODIMENT OF THE INVENTION

The mentioned drawings show an embodiment of the mixture-based composite product processing machine or instant beverage dispensing machine, as well as the mixing element in which mixing is performed in the machine, where said mixing element can be formed by a container and a cover.

Figure 1:
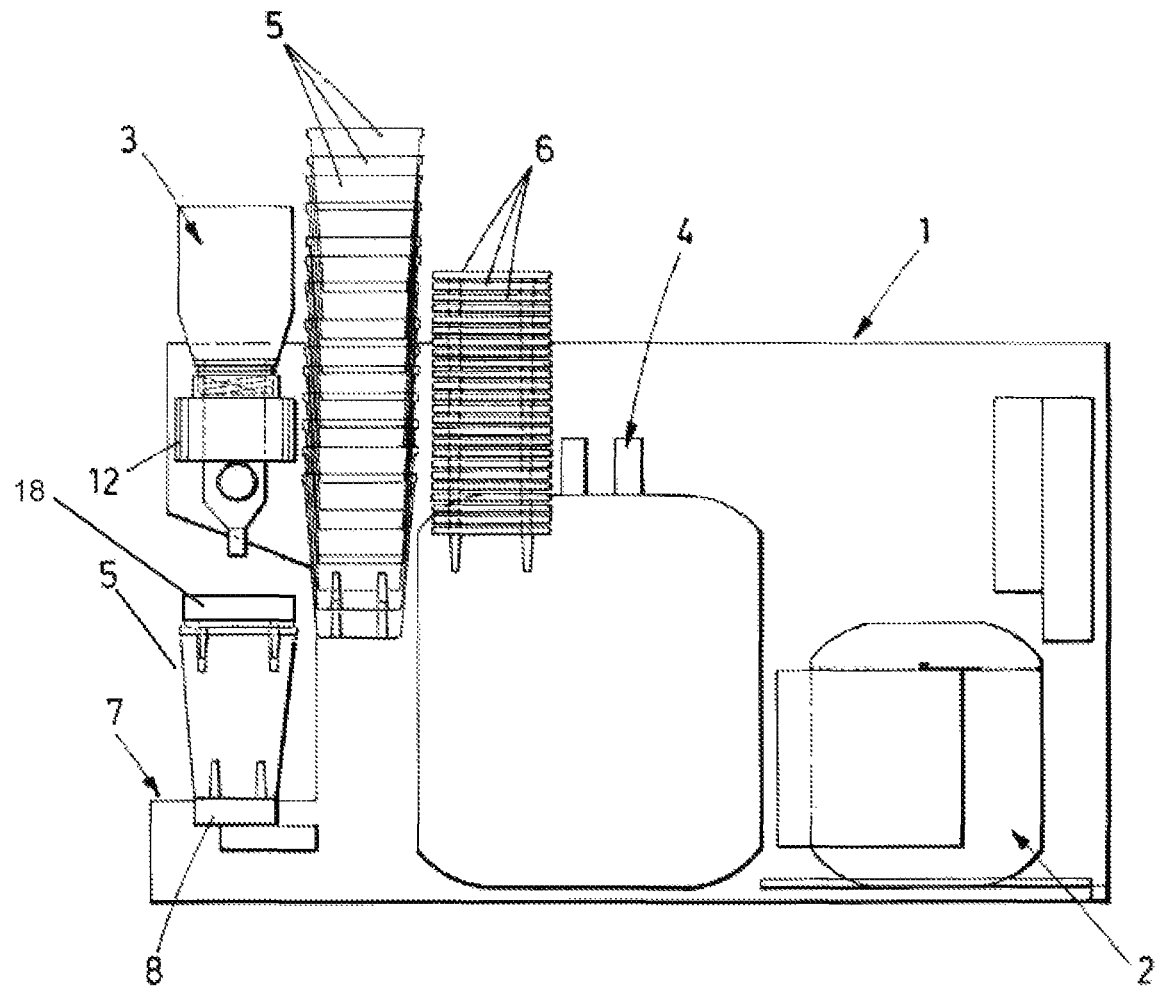
FIG. 1 shows a schematic section view of an example of the instant beverage dispensing machine object of the invention, where the main parts and elements it comprises can be seen.

FIG. 1 shows a diagram of a machine 1 according to the present invention which may comprise a cooling/heating module 2 for cooling or heating the water or liquid which is used to prepare the beverage and regulating the temperature thereof; and at least one product holding and dosing module 3 with a housing for holding the powder which is added to said liquid to prepare the beverage, either in capsules or in bulk, at least one dosing device for dosing said powder, and a regulator for regulating volume, and a dosing element for dosing liquid, preferably water, as well as other additional devices that may be required for correctly meting out the products into the mixing element. Additionally, the machine comprises a dispensing module 4 comprising solenoid valves which regulate the exit of the liquid into the mixing elements which are moved to said dispensing module. It preferably further comprises a dispenser for dispensing containers 5 and a dispenser for dispensing covers 6. Both elements, i.e., container 5 and cover 6, form the mixing element which sometimes can be made up exclusively by a mixing container 5, also referred to as the container 5, without any cover 6. Said dispenser or dispensers deposit the mixing container 5 and the cover 6 in a mixing space 7 having different mechanisms for moving a container 5 and/or the cover 6 of said container. In a preferred embodiment, said dispensing module 4 would comprise the dispensing module for dispensing containers 5 and the dispensing module for dispensing covers 6

To that end, the containers 5 are placed in the mixing space 7 from the dispensing module for dispensing containers 5 of the machine, and after pouring and dosing the products to be mixed into the container, the cover 6 is placed on the container 5, closing the container in a leak-tight manner.

The container 5 or cover 6 or both are placed on a spinning head through a coupling element 9, 11 arranged between the head and the container 5 and/or cover 6, said coupling element 9, 11 having an anchoring structure 10 for anchoring to the spinning head and a coupling structure 92, 112 for proper coupling to the container 5 or cover 6. The machine may comprise a head, i.e., the head can be an upper head for spinning the cover 6 of the mixing element if it is arranged in the upper portion of the mixing space 7, or a lower head for spinning the container 5 of the mixing element if it is arranged in the lower portion of the mixing space 7. There may also be two spinning heads, one in the upper portion and the other in the lower portion.

Once the container 5 and/or cover 6 are arranged in the head or heads, they spin, facilitating the mixing of the products inside the mixing element. In the case that the machine has two heads, the spinning of said heads, each controlled by a motor, can be:
   simultaneous, where the two heads spin at the same time, or independent, where only one head spins,
   in the same or different directions, such that both heads spin in the same direction or in opposite directions, causing the container 5 and cover 6 to spin in the same or different directions, and
   at the same or different speeds.

The mixing conditions can thereby be adapted to the different characteristics of the ingredients to be mixed so as to achieve an ideal mixing thereof. The machine spins at least the cup 5, the cover 6, or the cup 5 and cover 6 together, so that the powdery products and liquid held therein are mixed, and it optionally spins the cup 5 and the cover 6 independently in opposite directions or in the same direction, and/or alternating any of said options.

To that end, the lower spinning head 19, which is located in the lower portion of the mixing space 7 and can in turn constitute the base 8 of the machine on which the mixing container 5 is arranged, has a lower coupling element 9 with a structural configuration 92, also referred to as the coupling structure 92, that closely matches the complementary structural configuration 51 of the lower portion of the container 5, such that it fits therein and supports same, furthermore having an anchoring structure 10 for the connection thereof to the lower spinning head 19. This lower spinning head 19 moves the container 5.

In an alternative or complementary manner, the upper spinning head 18, which is located in the upper portion of the mixing space 7 and on which the covers 6 of the mixing element are coupled, has an upper coupling element 11 with a structural configuration 112 that closely matches the complementary structural configuration 61 of the upper portion of the cover 6, such that it fits therein and supports same, furthermore having an anchoring structure 10 for the connection thereof to the upper spinning head 18. This upper spinning head 18 moves the cover 6.

Optionally, both the upper coupling element 9 and lower coupling elements 11 are part of the supporting mechanism of the dispensing module 4 which pick up and move the container 5 and the cover 6 to place them, respectively, in the upper spinning head and/or lower spinning head in the mixing space 7 using the anchoring structures 10, where the pouring of the product is carried out once the device 12 for closing the covers 6 has arranged the cover 6 on the mixing container 5, before proceeding to the spinning of one or both elements.

It must be highlighted that the pouring and dosing of ingredients into the mixing container 5, as well as the closure of said container 5 with the cover 6, can be performed in a given space of the machine, and it can then be transferred to the mixing space 7 where the head or spinning heads will act. Likewise, both the dosing and pouring spaces and the mixing space 7 can be the same.

Figures 2, 3:
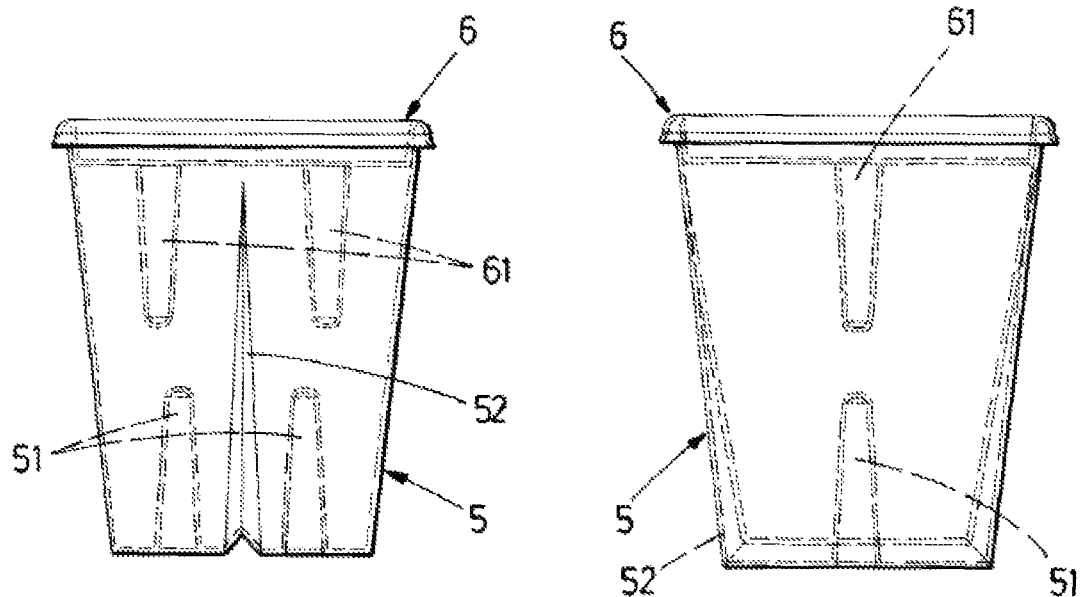
FIGS. 2 and 3 show respective section views of the mixing element with a container and a cover used in the machine of the invention, where the cover is depicted as being incorporated for closing the container, and where the internal configuration thereof can be seen.
Figure 4:
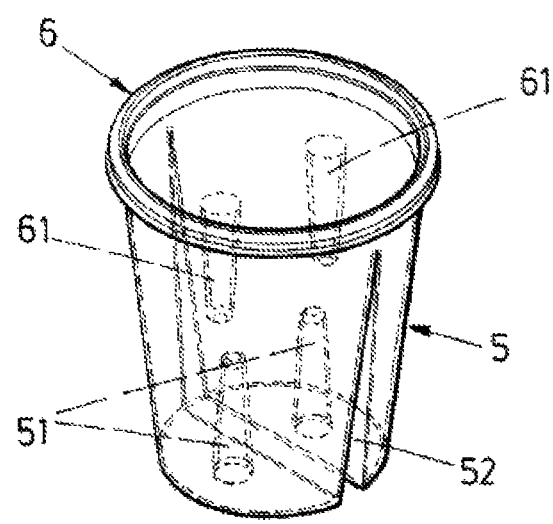
FIG. 4 shows a perspective view of the container shown in FIGS. 2 and 3 with the cover incorporated, also showing its internal elements by means of discontinuous lines.

In turn, the mixing container 5, to achieve said mixing of the products held therein, as seen in FIGS. 2 to 4, may comprise one or more hollow vertical elongations or protuberances 51, also referred to as the complimentary structural configuration of the lower portion of the container 51, emerging from the base thereof and being prolonged into same, such that they interfere with and/or change the spin of the powder and liquid mixture inside the mixing container 5 when it spins. Said hollow elongations 51 may have different shapes and lengths, but always with a lower base having an area that is larger than the opposite end of the elongation to allow stacking different containers 5. Said elongations may have different shapes, but they will preferably have a conical shape or frustoconical shape, a pyramidal or truncated pyramid shape, where the base of the pyramid may have any geometry (triangular, square, rectangular, etc.).

The container 5 also preferably has one or more side recesses 52 that go into the container and also allow the stacking thereof. Together with the mentioned vertical elongations 51, as explained, these side recesses break the liquid's inertia of movement during the mixing phase, cooperating in the process of mixing the ingredients inside the container 5.

The hollow elongations 51 preferably have a length of at least one fourth the height of the container 5, as it is the minimum preferable length for interfering with the spin for mixing the products, thereby contributing to the mixing thereof. The maximum height of the hollow elongations 51 is preferably three fourths the height of the container 5.

Furthermore, the vertical elongations 51 or side recesses 52 or both structures constitute means for assembly with the lower coupling element 9 for the anchoring thereof to the lower spinning head of the machine, the configuration of which is complementary so that it closely matches them. Specifically, as seen in FIGS. 5 to 7, said lower coupling element 9 has a part 91 with complementary elongations 92, also referred to as the coupling structure 92, emerging from same with a configuration and arrangement such that they fit tightly in the vertical elongations 51 and the side recesses 52 of the container 5.

In turn, the cover 6 of the mixing element can also have one or more preferably hollow vertical elongations or protuberances 61, also referred to as the complimentary structural configuration of the upper portion of the cover 61, that emerge from the lower surface of the cover, going into the inner space of the container 5, again aiding in the mixing process, said elongations or protuberances also having a stackable configuration and constituting means for assembly with the upper coupling element 11 of the machine, the configuration of which is complementary so that it closely matches them. FIGS. 5 to 7 show how said upper coupling element 11 also forms a surface 111 from which there emerge complementary protuberances 112 with a configuration and arrangement fitting in the vertical protuberances 61 of the cover 6.

Like in the case of the container 5, the elongations 61 of the cover 6 have the same function as the elongations 51 of the container 5, i.e., to break the inertia of the spinning movement of the mixing performed inside the container 5. The length of the elongations 61 of the cover 6 is at least about one fourth the height or length of the container 5 and its maximum length is about three fourths the maximum height or length of the container 5.

In any case, it is important to point out that the sum of the vertical elongations or protuberances 51 of the container 5 and the vertical elongations or protuberances 61 of the cover 6 do not exceed the internal height or length of the container, i.e., they do not run into one another when the container 5 and cover 6 spin independently.

The present invention allows combining the different alternatives that have been described, i.e., a machine with a single upper spinning head or a single lower spinning head or with both spinning heads which may interact with the parts of the mixing element, where said mixing element may comprise a container 5 with elongations 51 and a cover 6 without elongations 61, or a container 5 with elongations 51 and a cover 6 with elongations 61, or a container 5 without elongations 51 and a cover 6 with elongations 61. Likewise, it is possible for the mixing element not to have a cover 6, such that the machine only uses a container 5 with elongations 51.

The invention claimed is:

1. A mixture-based composite product processing machine which processes composite products based on a plurality of ingredients by means of at least mixing and dispensing same, said machine having a dosing module configured to pour the plurality of ingredients, a lower base, and a mixing space disposed between the dosing module and the lower base for housing a mixing element comprising at least one of a cover and a container to be located on the lower base, the machine comprising:
   a first spinning head;
   a first coupling element arranged between said first spinning head and the mixing space, said first coupling element having a coupling structure for coupling to the mixing element arranged in the mixing space;
   a second spinning head; and
   a second coupling element arranged between the second spinning head and the mixing space,
   wherein the at least one dosing module is configured to dose powder product as one of the plurality of ingredients,
   wherein the at least one dosing module is configured to dose liquid product as one of the plurality of ingredients,
   wherein the second coupling element comprises an anchoring structure for anchoring to the second spinning head, and wherein the first spinning head being arranged in a lower portion of the mixing space and the second spinning head in an upper portion of the mixing space, or vice versa.

2. The machine according to claim 1, wherein the first spinning head is arranged in a lower portion of the mixing space.

3. The machine according to claim 1, wherein the first spinning head is arranged in an upper portion of the mixing space.

4. The machine according to claim 1, wherein the first coupling element comprises an anchoring structure for anchoring to the first spinning head.

5. The machine according to claim 1,
wherein the first spinning head and the second spinning head are independent heads comprising independent spinning directions and speeds.

6. The machine according to claim 1, comprising a dispensing module for dispensing containers of the mixing elements.

7. The machine according to claim 1, further comprising a dispensing module for dispensing covers of the mixing elements.

8. The machine according to claim 1, wherein the mixing element comprises a hollow elongation positioned in an inner space of the mixing element,
wherein the coupling structure comprises at least one of a vertical projection or a protuberance complementary to the hollow elongation, and
wherein the hollow elongation is perpendicular to a base of the mixing element.

\* \* \* \* \*